United States Patent [19]
Bassman et al.

[11] Patent Number: 6,044,166
[45] Date of Patent: Mar. 28, 2000

[54] PARALLEL-PIPELINED IMAGE PROCESSING SYSTEM

[75] Inventors: Robert G Bassman, Austin, Tex.; Bhavesh B. Bhatt, Franklin Park; Bill J. Call, Allentown, both of N.J.; Michael W. Hansen, New Hope, Pa.; Stephen C. Hsu, East Windsor, N.J.; Gooitzen S. van der Wal, Hopewell, N.J.; Lambert E. Wixson, Rocky Hill, N.J.

[73] Assignee: Sarnoff Corporation, Princeton, N.J.

[21] Appl. No.: 08/606,171

[22] Filed: Feb. 23, 1996

Related U.S. Application Data

[63] Continuation-in-part of application No. 08/372,924, Jan. 17, 1995, abandoned.
[60] Provisional application No. 60/006,097, Oct. 31, 1995.

[51] Int. Cl.[7] .................................................. G06K 9/00
[52] U.S. Cl. ........................... 382/103; 382/325; 710/129; 710/132
[58] Field of Search .................................. 382/103, 107, 382/296, 307, 325; 395/800, 312, 309; 364/516; 348/149, 716; 701/1; 710/126, 129, 131, 132

[56] References Cited

U.S. PATENT DOCUMENTS

| | | | |
|---|---|---|---|
| 4,163,257 | 7/1979 | White ........................................ | 358/133 |
| 4,187,519 | 2/1980 | Vitols et al. ............................. | 358/169 |
| 4,214,265 | 7/1980 | Olesen ...................................... | 358/93 |
| 4,433,325 | 2/1984 | Tanaka et al. ........................... | 340/937 |
| 4,490,851 | 12/1984 | Gerhart et al. ............................ | 382/43 |
| 4,692,806 | 9/1987 | Anderson et al. ....................... | 358/209 |
| 4,839,648 | 6/1989 | Beucher et al. ........................ | 340/933 |
| 4,847,772 | 7/1989 | Michalopoulos et al. .............. | 364/436 |
| 4,858,113 | 8/1989 | Saccardi ................................. | 395/312 |
| 4,908,874 | 3/1990 | Gabriel .................................... | 382/296 |
| 5,034,986 | 7/1991 | Karmann et al. ........................... | 382/1 |
| 5,062,056 | 10/1991 | Lo et al. ................................. | 364/516 |
| 5,161,107 | 11/1992 | Mayeaux et al. ....................... | 364/436 |
| 5,175,824 | 12/1992 | Soderbery et al. ...................... | 395/325 |
| 5,255,374 | 10/1993 | Alderguia et al. ....................... | 395/325 |
| 5,261,059 | 11/1993 | Hedberg et al. ........................ | 395/312 |
| 5,281,964 | 1/1994 | Iida et al. ................................. | 340/936 |
| 5,283,573 | 2/1994 | Takatou et al. ......................... | 340/937 |
| 5,313,295 | 5/1994 | Taniguchi et al. ....................... | 348/149 |
| 5,359,674 | 10/1994 | van der Wal ............................ | 382/41 |
| 5,586,227 | 12/1996 | Kawana et al. ......................... | 395/112 |
| 5,592,237 | 1/1997 | Greenway et al. ..................... | 348/716 |
| 5,717,871 | 2/1998 | Hsieh et al. ............................. | 395/312 |

FOREIGN PATENT DOCUMENTS

WO9411852  5/1994  WIPO .......................... G08G 1/015

OTHER PUBLICATIONS

English Language Abstract of WO 94/11852, Nov. 10, 1992.
Traitement Du Signal, vol. 9. No. 4, 1992 Maciej Orkisz: "Localisation D'Objets Mobiles Dans des Scenes Naturelles Filmees par Une Camera Fixe".
Two–Dimensional Vehicle Tracking using Video–Image Processing, Sep. 2, 1992, Yamamoto, Kuwahara and Misra (Presented at the 3rd Vehicle Navigation & Information Systems Conference, Oslo, Norway, Sep. 2–4, 1992.
International Search Report from corresponding PCT application PCT/US96/00022.
Hierarchical Model–Based Motion Estimation, Mar. 23, 1992, James R. Bergen et al., (appearing in Proc. of European Conference on Computer Vision–92).

*Primary Examiner*—Jose L. Couso
*Assistant Examiner*—Matthew C. Bella
*Attorney, Agent, or Firm*—William J. Burke

[57] ABSTRACT

Apparatus for image processing a sequence of images containing a parallel-pipelined image processor comprised of image memories, a pyramid processing circuit, an arithmetic logic unit, a crossbar switch for video routing through the various components of the processor, signal processors to provide hardware programming through a global bus and also perform image processing operations. Images can be passed directly from the crossbar switch to internal static RAM of the signal processors through a first-in, first-out interface at full video rates.

26 Claims, 5 Drawing Sheets

PARALLEL-PIPELINED IMAGE PROCESSING SYSTEM

CROSS-REFERENCE TO RELATED APPLICATIONS

This application is a continuation-in-part application of U.S. patent application Ser. No. 08/372,924, filed Jan. 17, 1995, now abandoned, and forms a 35 U.S.C. Section 111(a) counterpart application for provisional application Ser. No. 60/006097, filed Oct. 31, 1995.

BACKGROUND OF THE INVENTION

1. Field of the Invention

The invention relates to an image processing system and, more particularly, to a parallel-pipelined image processing system that digitally processes pixels of successive image frames derived from a video camera to identify changes in a scene represented by the successive image frames.

2. Description of the Background Art

Many computer vision systems, for automatic surveillance and monitoring, seek to detect and segment transitory objects that appear temporarily in the system's field of view. Examples include traffic monitoring applications that count vehicles and automatic surveillance systems for security.

Various types of traffic monitoring systems that utilize vision processing systems are known in the prior art and examples thereof are respectively disclosed in U.S. Pat. Nos. 4,433,325, 4,847,772, 5,161,107 and 5,313,295.

Various image processing techniques that are useful in traffic monitoring systems have been discussed in the commonly assigned provisional patent application Ser. No. 60/006104 entitled "METHOD FOR CONSTRUCTING A REFERENCE IMAGE FROM AN IMAGE SEQUENCE" filed Oct. 31, 1995 and incorporated herein by reference. Also incorporated herein by reference is the disclosure of provisional patent application Ser. No. 06/006098 entitled "IMAGE-BASED OBJECT DETECTION AND TRACKING" filed Oct. 31, 1995 and the disclosure of provisional patent application Ser. No. 60/006100 (attorney docket DSRC 11912P) entitled "METHOD AND APPARATUS FOR DETERMINING AMBIENT CONDITIONS FROM AN IMAGE SEQUENCE" filed Oct. 31, 1995.

Further, the present invention makes use of pyramid teachings disclosed in U.S. Pat. No. 4,692,806, which issued to Anderson et al. on September 8, and image flow teachings disclosed in the article "Hierarchical Model-Based Motion Estimation" by Bergen et al., appearing in the *Proceedings of the European Conference on Computer Vision*, Springer-Verlag, 1992. Both of these teachings are incorporated herein by reference.

Although various image processing techniques are available, there is a need for a more robust image processing system for processing sequences of images to identify changes in the captured scene. A system that is computationally efficient and yet relatively inexpensive to implement would find use in applications such as traffic monitoring and security systems.

SUMMARY OF THE INVENTION

The invention is an implementation of the system first disclosed in U.S. patent application Ser. No. 08/372,924, filed Jan. 17, 1995, for processing a sequence of video images of a scene to determine the presence of a particular feature in the scene. The apparatus comprises a parallel-pipelined image processor comprised of image memories, a pyramid processing circuit, an arithmetic logic unit, a crossbar switch for video routing through the various components of the processor, digital signal processors to provide hardware programming through a global bus and also perform image processing operations. Images can be passed directly from the crossbar switch to the internal static random access memory (SRAM) of the signal processors through a first-in, first-out interface at full video rates.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1A:
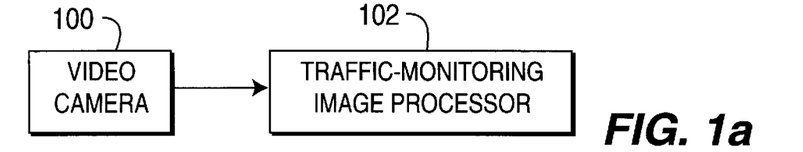
FIGS. 1*a* and 1*b* show alternative real time and non-real time ways of coupling a video camera to a traffic monitoring image processor.
Figure 1B:
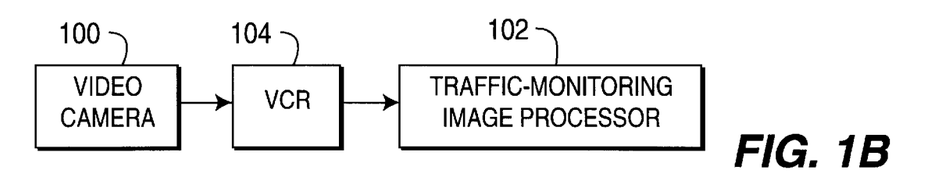

The present invention is an implementation of an image processing system embodied in a traffic monitoring system. The traffic monitoring system embodiment comprises at least one video camera for deriving successive image frames of road traffic and a traffic monitoring image processor for digitally processing the pixels of the successive image frames. As shown in FIG. 1*a*, the output of video camera 100 may be directly applied as an input to traffic monitoring image processor 102 for digitally processing the pixels of the successive image frames in real time. Alternatively, as shown in FIG. 1*b*, the output of video camera 100 may be first recorded by video cassette recorder (VCR) 104 and then, at a later time, the pixels of the successive image frames may be readout of the VCR and applied as an input to traffic monitoring image processor 102 for digitally processing the pixels of the successive image frames.

Figure 2A:
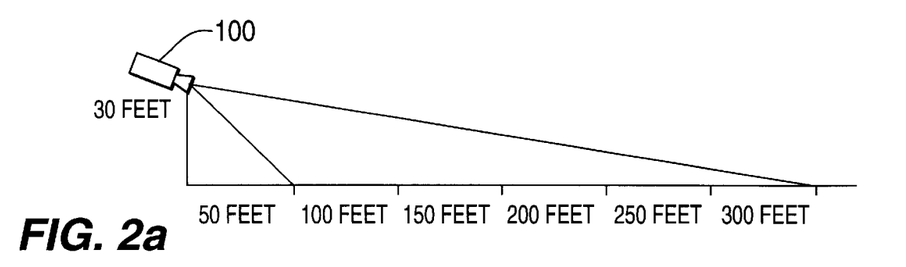
FIGS. 2*a*, 2*b* and 2*c* relate to the image field of a video camera viewing a multi-lane roadway.
Figure 2B:
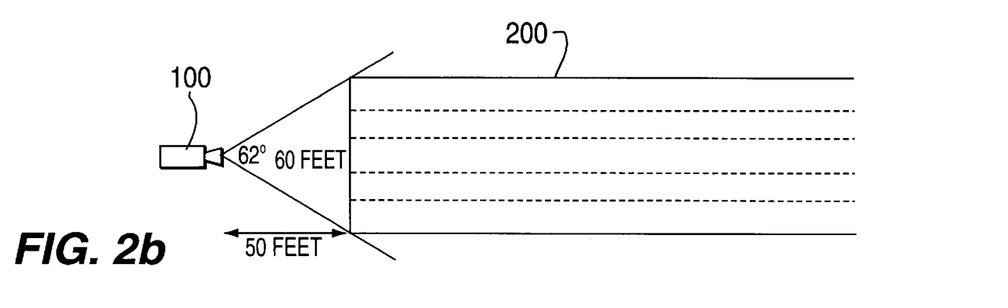
Figure 2C:
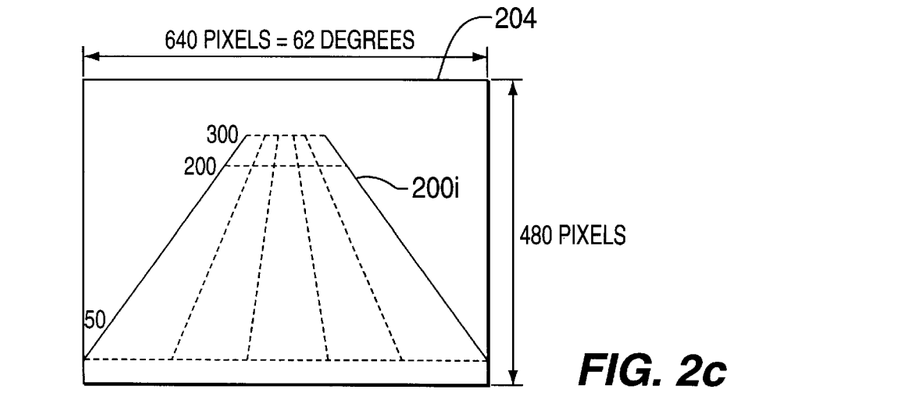

Video camera 100, which may be charge-coupled device (CCD) camera, an infrared (IR) camera, millimeter-wave sensor, or any other imaging sensor which is mounted at a given height over a roadway and which has a given field of view of a given length segment of the roadway. As shown in FIGS. 2*a* and 2*b*, video camera 100, by way of example, may be mounted 30 feet above the roadway and have a 62° field of view sufficient to view a 60 foot width (5 lanes) of a length segment of the roadway extending from 50 feet to 300 feet with respect to the projection of the position of video camera 100 on the roadway. FIG. 2*c* shows that video camera 100 derives a 640×480 pixel image of the portion of the roadway within its field of view. For illustrative purposes, vehicular traffic normally present on the length segment of the roadway has been omitted from the FIG. 2c image.

In a designed vehicular traffic monitoring system, video camera 100 was one of a group of four time-divided cameras each of which operated at a frame rate of 7.5 frames per second.

A principal purpose of the present invention is to be able to provide a computationally-efficient digital traffic-monitoring image processor that is capable of more accurately detecting, counting and tracking vehicular traffic traveling over the viewed given length segment of the roadway than was heretofore possible. For instance, consider the following four factors which tend to result in detecting, and tracking errors or in decreasing computational efficiency:

1. Low Contrast:

A vehicle must be detected based on its contrast relative to the background road surface. This contrast can be low when the vehicle has a reflected light intensity similar to that of the road. Detection errors are most likely under low light conditions, and on gray, overcast days. The system may then miss some vehicles, or, if the threshold criteria for detection are low, the system may mistake some background patterns, such as road markings, as vehicles.

2. Shadows and Headlight Reflections:

At certain times of day vehicles will cast shadows or cause headlight reflections that may cross neighboring lanes. Such shadows or headlight reflections will often have greater contrast than the vehicles themselves. Prior art type traffic monitoring systems may then interpret shadows as additional vehicles, resulting in an over count of traffic flow. Shadows of large vehicles, such as trucks, may completely overlap smaller cars or motor cycles, and result in the overshadowed vehicles not being counted. Shadows may also be cast by objects that are not within the roadway, such as trees, building, and clouds. And they can be cast by vehicles going the other direction on another roadway. Again, such shadows may be mistaken as additional vehicles.

3. Camera Sway:

A camera that is mounted on a utility pole may move as the pole sways in a wind. A camera mounted on a highway bridge may vibrate when trucks pass over the bridge. In either case camera motion results in image motion and that cause detection and tracking errors. For example, camera sway becomes a problem if it causes the detection process to confuse one road lane with another, or if it causes a stationary vehicle to appear to move.

4. Computational Efficiency:

Since vehicle travel is confined to lanes and normal travel direction is one dimensional along the length of a lane, it is computationally inefficient to employ two-dimensional image processing in detecting and tracking vehicular traffic.

The present invention is directed to a digital traffic-monitoring image processor that includes means for overcoming one or more of these four problems.

Figure 3:
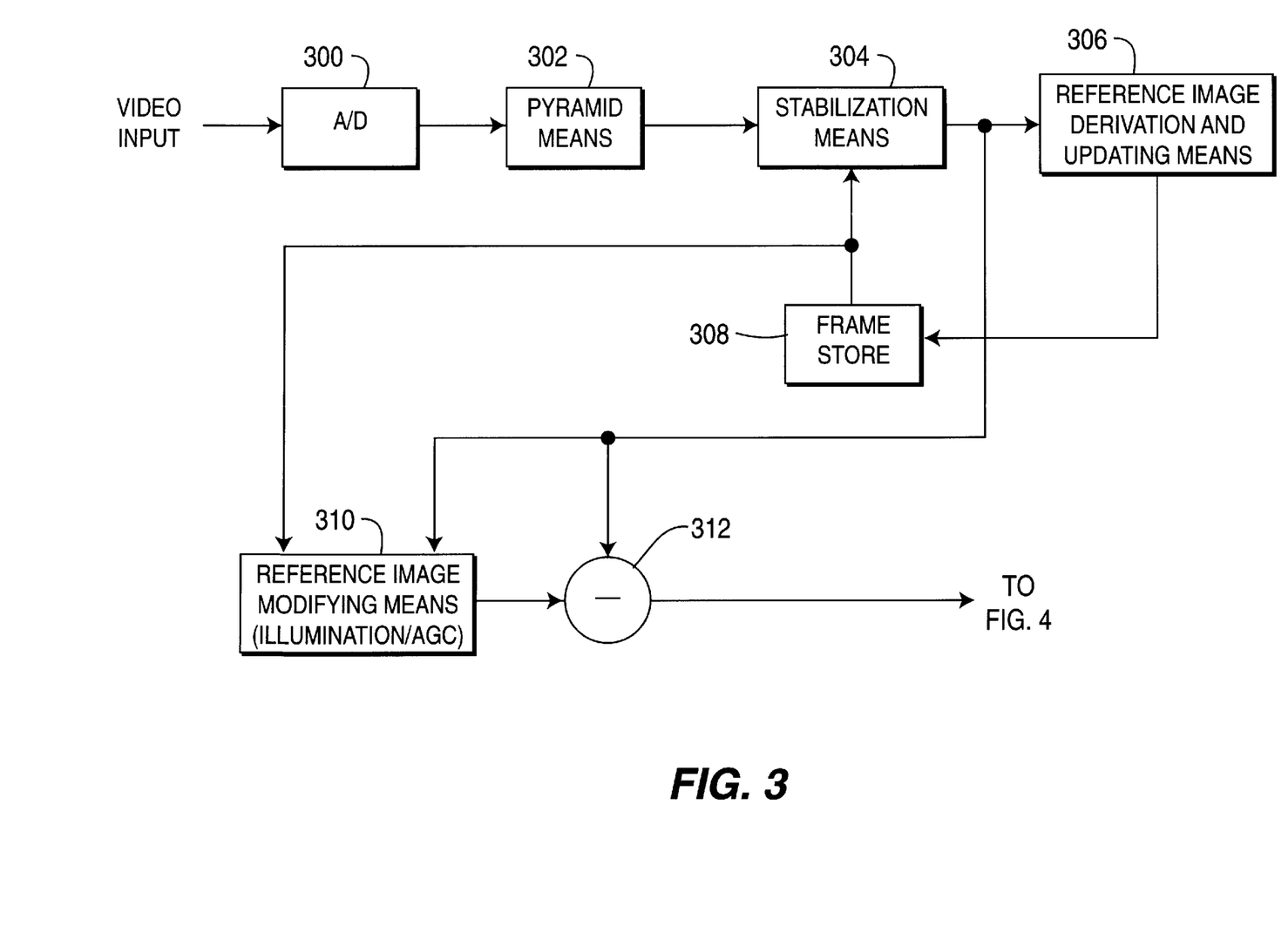
FIG. 3 is a functional block diagram of the preprocessing portion of the digital image processor of the present invention.

Referring to FIG. 3, there is shown a functional block diagram of a preferred embodiment of a preprocessor portion digital traffic-monitoring image processor 102. Shown in FIG. 3 are analog-to-digital (A/D) converter 300, pyramid means 302, stabilization means 304, reference image derivation and updating means 306, frame store 308, reference image modifying means 310 and subtractor 312.

The analog video signal input from camera 100 or VCR 104, after being digitized by A/D 300, may be decomposed into a specified number of Gaussian pyramid levels by pyramid means 302 for reducing pixel density and image resolution. Pyramid means 302 is not essential, since the vehicular traffic system could be operated at the resolution of the 640×480 pixel density of video camera 100. However, because this resolution is higher than is needed downstream for the present vehicular traffic system, the use of pyramid means 302 increases the system's computational efficiency. Not all levels of the pyramid must be used in each computation. Further, not all levels of the pyramid need be stored between computations, as higher levels can always be computed from lower ones. However, for illustrative purposes it is assumed that all of the specified number of Gaussian pyramid levels are available for each of the downstream computations discussed below.

The first of these downstream computations is performed by stabilization means 304. Stabilization means 304 employs electronic image stabilization to compensate for the problem of camera sway, in which movement may be induced by wind or a passing truck. Camera motion causes pixels in the image to move. Prior art vehicular traffic systems that do not compensate for camera motion will produce false positive detections if the camera moves so that the image of a surface marking or a car in an adjacent lane overlaps a detection zone. Stabilization means 304 compensates for image translation from frame to frame that is due to camera rotation about an axis perpendicular to the direction of gaze. The compensation is achieved by shifting the current image an integer number of rows and columns so that, despite camera sway, it remains fixed in alignment to within one pixel with a reference image derived by means 306 and stored within frame store 308. The required shift is determine by locating two known landmark features in each frame. This is done via a matched filter.

The problem of low contrast is overcome by the cooperative operation of reference image derivation and updating means 306, frame store 308 and reference image modifying means 310. Means 306 generates an original reference image $r_o$ simply by blurring the first-occurring image frame $i_o$ applied as an input thereto from means 304 with a large Gaussian filter (so that reference image $r_o$ may comprise a higher pyramid level), and then reference image $r_o$ is stored in frame store 308. Following this, the image stored in frame store 308 is updated during a first initialization phase by means 306. More specifically, means 306 performs a recursive temporal filtering operation on each corresponding pixel of the first few image frames of successive stabilized image frames applied as an input thereto from means 304. with the additional constraint that if the difference between the reference image and the current image is too large, the reference image is not updated at that pixel. Put mathematically, $$r_{t-}(x, y) = \begin{cases} r_{t-1}(x, y) + \gamma[i_t(x, y) - r_{t-1}(x, y)] & \text{if } |i_t(x, y) - r_{t-1}(x, y)| < D \\ r_{t-1}(x, y) & \text{otherwise} \end{cases} \quad (1)$$

where $r_t$ represents the reference image after frame t, and $i_t$ represents the t'th frame of the input image frame sequence from means 304. The constant $\gamma$ determines the "responsiveness" of the construction process.

The "responsiveness" setting of $\gamma$ must be sufficiently slow to keep transitory objects, such as moving vehicles or even vehicles that may be temporarily stopped by a traffic jam, out of the reference image, so that, at the end of the first few input image frames to means 306 which comprise the first initialization phase, the stored reference image in frame store 308 will comprise only the stationary background objects being viewed by camera 100. Such a "responsiveness" setting of γ is incapable of adjusting $r_t$ quickly enough to add illumination changes (such as those due to a passing cloud or the auto-iris on camera 100) to the reference image. This problem is solved at the end of the initialization phase by the cooperative updating operation of reference image modifying means 310 (which comprises an illumination/AGC compensator) with that of means 306 and frame store 308. Specifically, when the initialization phase is completed, it is replaced by a second normal operating phase which operates in accordance with the following equation 2 (rather than the above equation 1):

$$r_t(x,y)=r_{t-1}(x,y)+\gamma[i_t(x,y)-r_{t-1}(x,y)] \quad (2)$$

In this normal operating phase the reference image $r_t$ stored in frame store 308 is then passed to reference image modifying means 310 which computes the illumination-compensated reference image $r'_t$ according to the following equation:

$$r_t(x,y)=k_t r_t(x,y)+c_t \quad (3)$$

where $k_t$ and $c_t$ are the estimated gain and offset between the reference image $r_t$ and the current image $i_t$ computed by means 310. Means 310 computes this gain and offset by plotting a cloud of points in a 2D space in which the x-axis represents gray-level intensity in the reference image, and the y-axis represents gray-level intensity in the current image, and fitting a line to this cloud. The cloud is the set of points $(r_{t-1}(x,y),i_t(x,y))$ for all image positions x,y, at which $|i_t(x,y)-r_{t-1}(x,y)|<D$. This approach will work using any method for computing the gain and offset representing illumination change. For example, the gain might be estimated by comparing the histograms of the current image and the reference image. Also, the specific update rules need not use an absolute threshold D as described above. Instead, the update could be weighted by any function of $|i_t(x,y)-r_{t-1}(x,y)|$.

The above approach allows fast illumination changes to be added to the reference image while preventing transitory objects from being added. It does so by giving the cooperative means the flexibility to decide whether the new reference image pixel values should be computed as a function of pixel values in the current image or whether they should be computed simply by applying a gain and offset to the current reference image. By applying a gain and offset to the current reference image the illumination change can be simulated without running the risk of allowing transitory objects to appear in the reference image.

The result is that the amplitude of the stationary background manifesting pixels of the illumination-compensated reference image (which includes both stationary background manifesting pixels and moving object (i.e., vehicular traffic)) will always be substantially equal to the amplitude of the stationary background manifesting pixels of the reference image (which includes solely stationary background manifesting pixels) appearing at the output of reference image modifying means 310. Therefore, subtractor 312, which computes the difference between the amplitudes of corresponding pixels applied as inputs thereto from means 310 and 304, derives an output made up of significantly-valued pixels that manifest solely moving object (i.e., vehicular traffic) in each one of successive 2D image frames. The output of subtractor 312 is forwarded to the detection and tracking portion of traffic-monitoring image processor 102 shown in FIG. 4.

Figure 4:
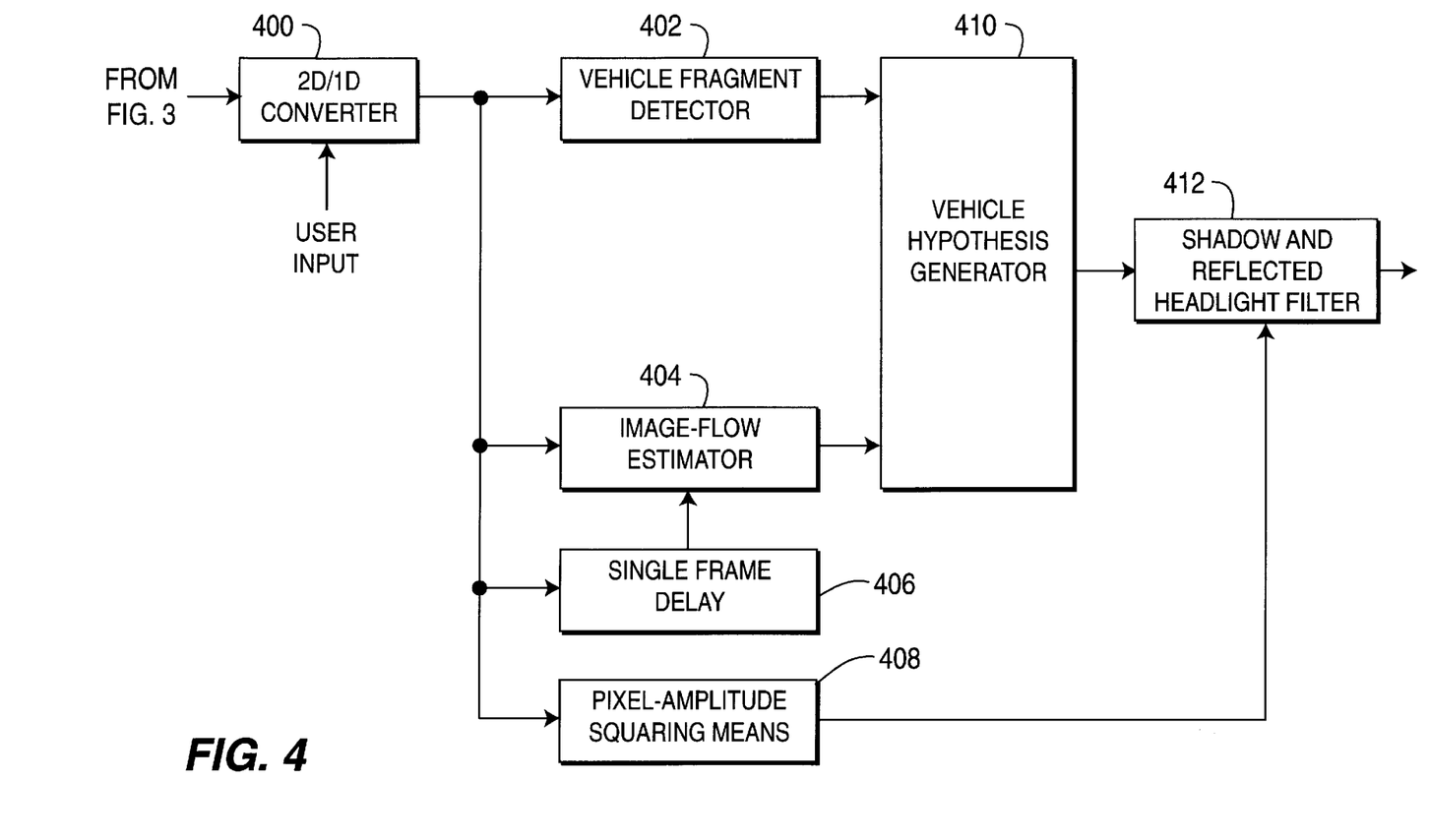
FIG. 4 is a functional block diagram of the detection and tracking portion of the digital image processor of the present invention.

Referring to FIG. 4, there is shown 2D/1D converter 400, vehicle fragment detector 402, image-flow estimator 404, single frame delay 406, pixel-amplitude squaring means 408, vehicle hypothesis generator 410 and shadow and reflected headlight filter 412.

Figure 5:
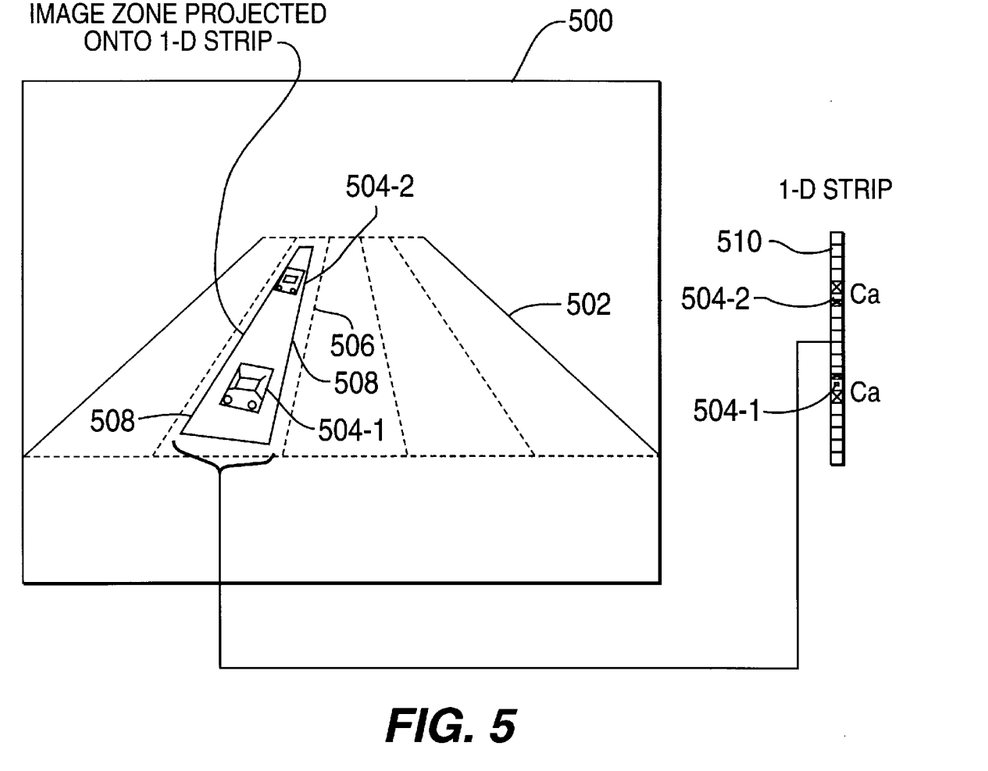
FIGS. 5 and 5*a* illustrate the manner in which image pixels of a 2D delineated zone of a roadway lane are integrated into a 1D strip.

2D/1D converter 400 operates to convert 2D image information received from FIG. 3 that is applied as a first input thereto into 1D image information in accordance with user control information applied as a second input thereto. In this regard, reference is made to FIGS. 5 and 5a. FIG. 5 shows an image frame 500 derived by camera 100 of straight, 5-lane roadway 502 with cars 504-1 and 504-2 traveling on the second lane 506 from the left. Cars 504-1 and 504-2 are shown situated within an image zone 508 delineated by the aforesaid user control information applied as a second input to converter 400. By integrating horizontally the amplitudes of the pixels across image zone and then subsampling the vertically oriented integrated pixel amplitudes along the center of zone 508, 1D strip 510 is computed by converter 400. The roadway need not be straight. As shown in FIG. 6a, curved roadway lane 512 includes zone 514 defined by user-delineated lane boundaries 516 which permits the computation of medial strip 518 by converter 400. In both FIGS. 5 and 5a, the user may employ lane-defining stripes that may be present in the image as landmarks for help in defining the user-delineated lane boundaries.

Figure 5A:
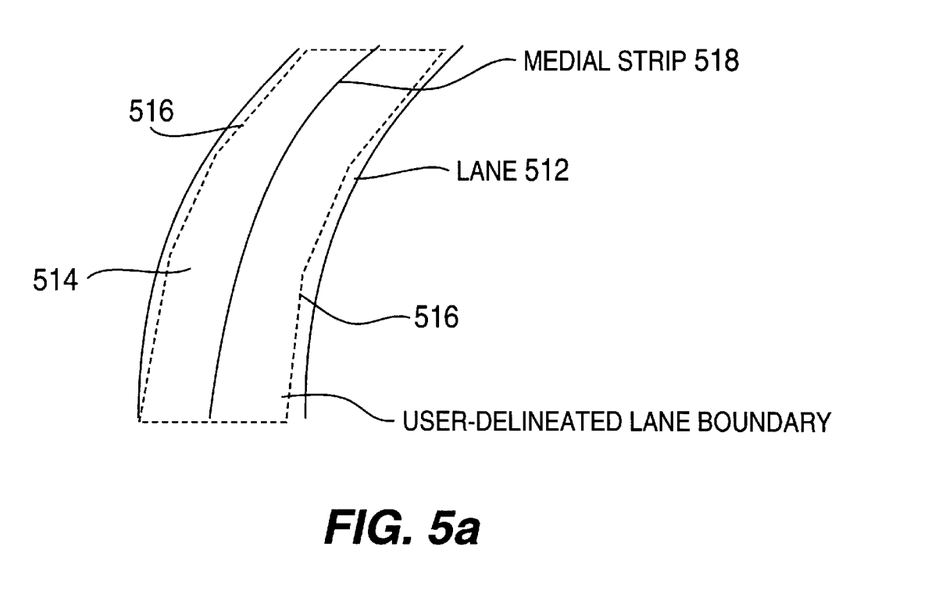

More specifically, computation by converter 400 involves employing each of pixel positions (x,y) to define integration windows. For example, such a window might be either (a) all image pixels on row y that are within the delineated lane bounds, (b) all image pixels on column x that are within the delineated lane bounds, or (c) all image pixels on a line perpendicular to the tangent of the medial strip at position (x,y). Other types of integration windows not described here may also be used.

The 1D output from converter 400 is applied as an input to detector 402, estimator 404 and single frame delay 406, and through means 408 to filter 408. While the respective detection, tracking and filtering functions performed by these elements are independent of whether they operate on 1D or 2D signals, 1D operation is to be preferred because it significantly reduces computational requirements. Therefore, the presence of converter 400, while desirable, is not essential to the performance of these detection, tracking and filtering functions. In the following discussion, it is assumed that converter 400 is present Detector 402 preferably utilizes a multi-level pyramid to provide a coarse-to-fine operation to detect the presence and spatial location of vehicle fragments in the 1D strip of successive image frames received from FIG. 3. A fragment is defined as a group of significantly-valued pixels at any pyramid level that are connected to one another. Detector 402 is tuned to maximize the chances that each vehicle will give rise to a single fragment. However, in practice this is impossible to achieve; each vehicle gives rise to multiple fragments (such as separate fragments corresponding to the hood, roof and headlights of the same vehicle). Further, pixels of more than one vehicle may be connected into a single fragment.

One technique for object detection at each strip pixel position is to compute a histogram of the image intensity values within the integration window centered at that pixel position. Based on attributes of this histogram (e.g., the number or percentage of pixels over some threshold value or values), classify that strip pixel as either "detection" or "background". By performing this operation at each strip pixel, one can construct a one-dimensional array that contains, for each pixel position, the "detection" or "background" label. By performing connected component analysis within this array, adjacent "detection" pixels can be grouped into "fragments".

Image-flow estimator 404 in cooperation with delay 406, which employs the teachings of the aforesaid Bergen et al. article, to permit objects to be tracked over time. Briefly, in this case, this involves, at each pixel position, computing and storing the average value contained within the integration window. By performing this operation at each strip pixel, a one-dimensional array of average brightness values is constructed. Given two corresponding arrays for images taken at times t−1 and t, the one-dimensional image "flow" that maps pixels in one array to the other is computed. This can be computed via one-dimensional least-squares minimization or one-dimensional patchwise correlation. This flow information can be used to track objects between each pair of successive image frames.

The respective outputs of detector 402 and estimator 404 are applied as inputs to vehicle hypothesis generator 410. Nearby fragments are grouped together as part of the same object (i.e., vehicle) if they move in similar ways or are sufficiently close together. If the positions of multiple fragments remain substantially fixed with respect to one another in each of a train of successive frames, they are assumed to indicate only a single vehicle. However, if the positions of the fragments change from frame to frame, they are assumed to indicate separate vehicles. Further, if a single fragment in one frame breaks up into multiple fragments or significantly stretches out longitudinally in shape from one frame to another, they are also assumed to indicate separate vehicles.

At night, the presence of a vehicle may be indicated only by its headlights. Headlights tend to produce headlight reflections on the road. Lighting conditions on the road during both day and night tend to cause vehicle shadows on the road. Both such shadows and headlight reflections on the road result in producing detected fragments that will appear to generator 410 as additional vehicles, thereby creating false positive error in the output from generator 410. Shadow and reflected headlight filter 412, which discriminates between fragments produced by valid vehicles and those produced by shadows and reflected headlights, eliminates such false positive error.

The output from pixel-amplitude squaring means 408 manifests the relative energy in each pyramid-level pixel of the strip output of each of successive image frames from converter 400. Filter 412 discriminates between fragments that produced by valid vehicles and those produced by shadows and reflected headlights based on an analysis of the relative amplitudes of these energy-manifesting pixels from means 408. The fact that the variance in energy pixel amplitude (pixel brightness) of shadow and reflected headlight fragments is significantly less than that of valid vehicle fragments can be used as a discriminant.

Another way of filtering, not shown in FIG. 4, is to employ converter 400 for discriminating between objects and shadows using the background-adjusted reference image. At each pixel position, the following information is computed over the integration window:

(a) the number of pixels with brightness value greater than some threshold p, over all image pixels within the integration window;

(b) the maximum absolute value, over all image pixels within the integration window; and (c) the number of adjacent pixels $(x_1, y_1,$ and $(x_2, y_2)$ within the integration window whose absolute difference, $|I(x_1,y_1)-I(x_2,y_2)|$, exceeded a threshold value.

Fragments that have been extracted as described previously can be classified as object or shadow based on these or other properties. For example, if the value of measure (a), summed over all strip pixels within the fragment, exceeds some threshold, then the fragment cannot be a shadow (since shadows would never have positive brightness values in the images applied to converter 400 from FIG. 3. A similar summation using measure (c) provides another test measuring the amount of texture within the fragment, which can also be thresholded to determine whether a fragment is an object or a shadow. While the input to filter 412 defines all hypothesized vehicle locations, the output therefrom defines only verified vehicle locations. The output from filter 412 is forwarded to utilization means (not shown) which may perform such functions as counting the number of vehicles and computing their velocity and length.

Vehicle fragment detector 402, image-flow estimator 404, and vehicle hypothesis generator 410 may use predetermined camera calibration information in their operation. Further, each of the various techniques of the present invention described above may also be employed to advantage in other types of imaging systems from the vehicular traffic monitoring system disclosed herein.

Figure 6:
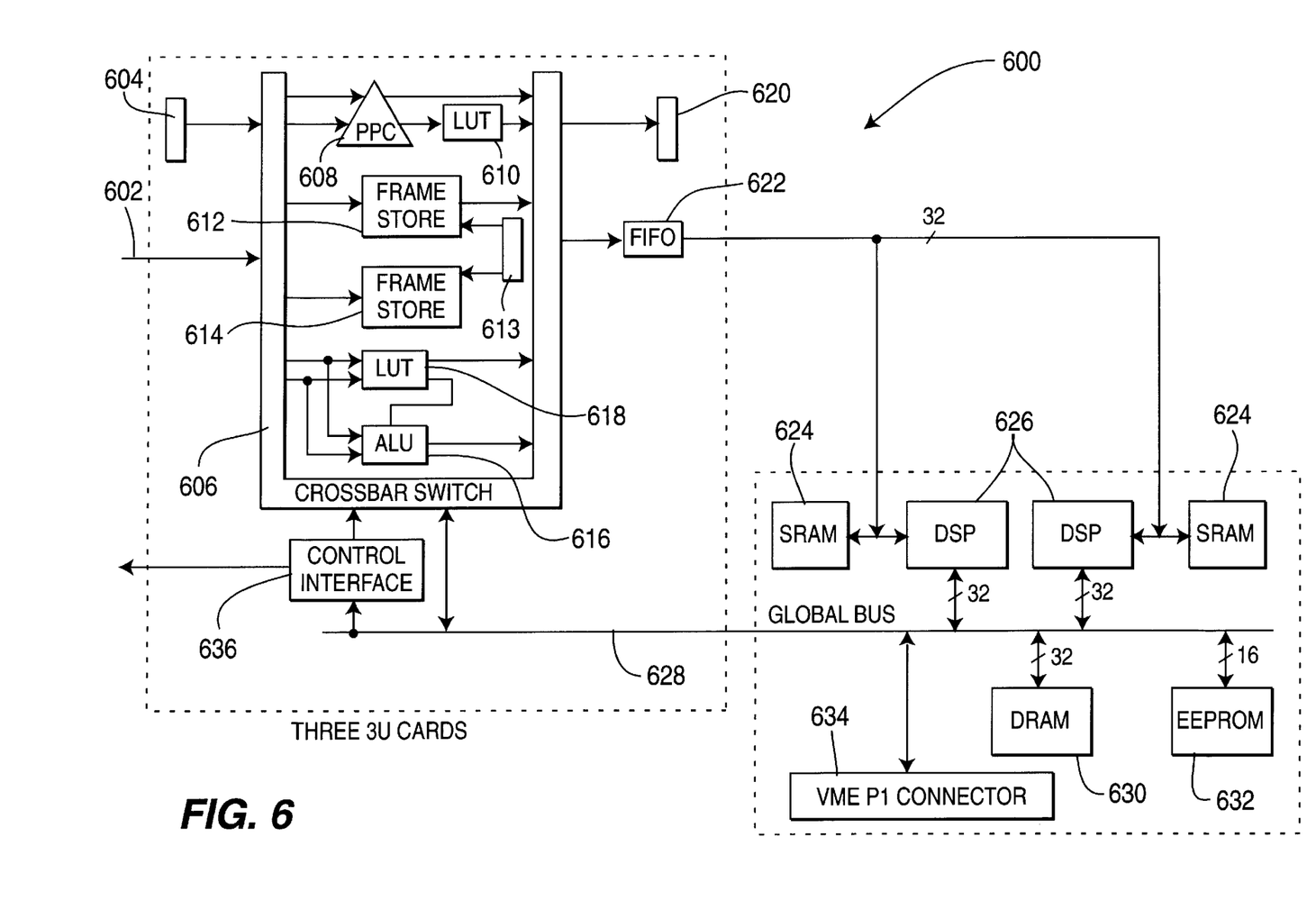
FIG. 6 is a block diagram of implementing hardware of the image processing system of the present invention.

FIG. 6 depicts a block diagram of an image processing system that primarily finds use in the field of machine or computer vision. As such, the system is known as a vision processing system. This vision processing system (VPS) 600, suitable among other purposes for surveillance and monitoring applications, is shown in block diagram form illustrating the viewing system interconnectivity and data flow. The system is a parallel-pipelined image processing system comprised of image memories (frame stores) 612 and 614, a pyramid processing integrated circuit 608 for image convolution, an arithmetic logic unit (ALU) 616, and a crossbar switch 606 for video routing through the various components. Two digital signal processors (DSP) 626 are present in the system as well, which provide hardware programming through a global bus 628 and also perform image processing operations. Images can be passed directly from the crossbar switch 606 to the internal static RAM (SRAM) 624 of the DSPs through a first-in-first-out (FIFO) 622 interface at full video rates.

The system includes at least one imaging means not shown, such as a video camera, CCD camera or an IR camera, for deriving successive image frames of a scene and an image processor for digitally processing the pixels of the successive image frames. As shown in FIG. 6, the output of the imager is directly applied as an input 602 to VPS 600 for digitally processing the pixels of the successive image frames in real time. A port 604 for a test input is also provided.

A crossbar switch 606 comprising an 8 channel by 10 bit switch that provides non-blocking interconnectivity and fan-out from any input source to any output destination. This device is used to route the image data flow from one processing component or frame store memory to another component. An example crossbar switch providing this capability is the LSI Logic L64270.

A pyramid processing circuit (PPC) 608 is used by the VPS 600 to generate Gaussian and Laplacian pyramids. A preferred PPC is described in U.S. Pat. No. 5,359,674, the disclosure of which is incorporated herein by reference. An 8-bit look-up table (LUT) 610 is connected to one of the PPC output paths to facilitate pointwise operations on a single image. The PPC 608 performs the function discussed above with regard to Pyramid means 302 of FIG. 3.

Frame stores 612 and 614 are memories with frame store controllers that provide triple-ported access of stored images. The memories themselves are implemented with video RAMs (VRAMs) and support 20 MHz simultaneous read and store operations, in addition to random access over the global bus (described below). Currently, a field-programmable gate array (FPGA) is used as the frame store controller 613 for the frame stores. An example of an appropriate FPGA is a Xilinx XC4010.

The combination ALU 616 and LUT 618 provide detection functions required for the identification of vehicles in delineated traffic lanes, image accumulation functions, pointwise single image or dual image operations in the form of a look-up table transformations, and image transpositions (making image rows into columns and vice versa). The ALU 616 is implemented in a single FPGA (Xilinx XC4010) in lieu of the discrete components that would be required. The LUT 618 is implemented using 128K×16 bit SRAM, and is controlled with the ALU FPGA.

The ALU 616 also supports a series of row-wise operations on an original image with an auxiliary input that represents a bit-encoded lane (strip) mask image. This mask image is used to define the location of a region or zone, such as a traffic lane to be monitored as described above, with each different lane represented by setting a different bit in the intensity of the image (i.e., all pixels overlooking the ith traffic lane would have the ith bit of the image intensity set to 1). These row-wise masked operations include summation of intensity values over the masked area and energy computations (sum of intensity differences between adjacent pixels). One value is returned by the ALU 616 for each row for each of these two measures. Furthermore, the ALU 616 can process and report multiple lanes (strips) in a single pass. This is how the operations of the 2D/1D converter function 400 are implemented. The ALU 616 can also perform run-length encoding of an image and provide image intensity summation over the full extent of the image. The ALU forms the reference image derivation and updating means 306. The ALU also, together with one of the DSPs 626, forms the reference image modifying means 306 of FIG. 3. Furthermore, the ALU accomplishes all the functions represented by the functional block diagram depicted in FIG. 4.

Additional input and output paths such as a test output 620 are provided at 20 MHz directly to the crossbar switch 606 for video input and output for testing purposes.

The first-in, first-out interface (FIFO) 622 is connected directly to the crossbar switch 606. This device is used as a 20 MHz (20 Mbyte/sec) data transfer interface for moving images from the crossbar switch into the local SRAM 624 of each DSP 626. The SRAM are 128K by 32 bits wide. The DSPs 626 is preferably a Texas Instruments TMS320C31 DSP integrated circuit, although other DSPs with similar characteristics can be used. The DSPs 626 are used for hardware control and for the operation on 1D images represented by functions 402, 404, 406, 408, 410, and 412, as well as the gain and offset estimation which is one component of the reference image modifying means 310. Each DSP 626 has its own bank of SRAM that can be accessed in a non-blocking fashion. Also, each DSP can access a global bus (see below) for communicating with other VPS components.

The global bus 628, shown as single solid line, is an arbitrating bus that allows the two DSPs and VMEbus (over the VMEbus to global bus bridge, see below) to access the hardware control registers, frame stores 612, a common 256K by 32 bit DRAM bank 630, and a reprogrammable 256K by 16 bit flash EPROM 632.

The EPROM 632 is used for storing application code and boot-up code for DSP 626. This memory is non-volatile so it can be used to power up the VPS without outside program loading.

The common DRAM bank 630 can be accessed by either DSP 126 or the VMEbus interface 634 through the global bus 628. The DRAM memory bank 630 is primarily used for communications between the two DSPs 626 and the VMEbus interface 634. In the traffic control application, typical data present in the DRAM bank 630 includes vehicle information such as a vehicle's speed, length, and duration that it has been monitored by the system.

The VPS system 600 is fabricated on 3 3U VME boards. The VMEbus P1 connectors of the VME boards are intended to be connected to a standard A24/D16 VMEbus. This enables other VME master devices to access the global bus 628 of the VPS 600 through a VMEbus to global bus bridge. The VMEbus to global bus bridge implementation uses a programmable logic device (PLD) in lieu of discrete components.

A host CPU (not shown) uses the VMEbus interface to access the global bus 628 of the VPS. Messages are stored in the DRAM bank 630 for communication between all devices, including between the two DSPs 626 and the host CPU. In the traffic control application, typical information provided to the host CPU includes all vehicle information, system status messages, run-time error messages, and other overhead messages such as low-level parameter passing and command initiation (such as a request for a compressed bitstream). In the case of video compression, the compressed bitstream is sent as a special message or sequence of messages over the VMEbus interface.

The control interface 636 provides address decoding and other bridging for programming the parallel pipelined hardware components including the crossbar switch 606 over the global bus 628. This control interface is implemented using a programmable logic array (PLA), such as an Altera EPM7128, rather than with discrete logic components.

The bit capacity of each bus is given by the number associated with the slash across the particular bus.

The VPS System 600 is also suitable for image processing tasks other than specifically traffic monitoring. Among these tasks is video compression. A common algorithm for compression is to (1) construct a Laplacian image pyramid of the image to be encoded, (2) then quantize the image at each level of this Laplacian pyramid so that small values are set to 0, (3) then run-length encode the image at each level of this quantized Laplacian pyramid so that adjacent strings of 0s can be sent with a small number of bytes, (4) then transmit this run-length encoded representation to the receiver. In the VPS System 600, these steps can be performed as follows. The Laplacian pyramid can be generated by the pyramid processing chip 608, and can then be quantized by the LUT 610. This quantized representation can then be sent via the crossbar switch 606 to the ALU 616 which performs the run-length encoding. The run-length encoded image can then be sent via the crossbar switch 606 to the FIFO 622 and from there to the SRAM 624. The DSP 626 can then possibly compress this image further and then write the result to the DRAM 630. The host CPU can then retrieve this compressed representation using the VME bus 634.

It is to be understood that the apparatus and method of operation taught herein are illustrative of the invention. Modifications may readily be devised by those skilled in the art without departing from the spirit or scope of the invention. The invention can be used as part of an automatic surveillance system such as a traffic control system or other monitoring or tracking system. The output of the VPS may be connected to a computer or other control device for controlling, among other things, access to an area or the flow of traffic.

What is claimed is:

1. Apparatus for image processing a sequence of images representing a scene comprising:
   a cross-bar switch for selectively routing said sequence of images to a plurality of image storage elements, a pyramid processing circuit, and an arithmetic logic unit;
   a buffer, connected to an output port of the crossbar switch, for buffering images from the crossbar switch at video rates;
   a first digital signal processor and a second digital signal processor, connected to said buffer, for processing said images from said crossbar switch where said buffered images from said buffer are coupled directly to a random access memory of said first and second digital signal processors; and
   a global bus, connected to said crossbar switch and said first and second digital signal processors, for communicating information between said first digital signal processor, said second digital signal processor, said crossbar switch and an output connector.

2. The apparatus of claim 1 wherein said arithmetic logic unit transforms a two-dimensional image portion into a one-dimensional representation of the image portion.

3. The apparatus of claim 1 wherein said output connector is a VME P1 connector.

4. The apparatus of claim 1 further comprising a dynamic random access memory (DRAM), connected to said global bus, for storing information derived from processing said images.

5. The apparatus of claim 1 wherein said crossbar switch is an eight channel by ten bit switch that provides non-blocking interconnectivity of images.

6. The apparatus of claim 1 wherein the pyramid processing unit generates a Gaussian and Laplacian pyramid from images provided by the crossbar switch.

7. The apparatus of claim 1 wherein said image storage elements are video random access memories (VRAMs).

8. The apparatus of claim 1 further comprising a look up table connected to said arithmetic logic unit and said crossbar switch.

9. The apparatus of claim 8 wherein said arithmetic logic unit further comprises means for pointwise subtracting landmark image patches in a reference image from corresponding image patches in a current image, and an illumination-compensated reference image from a current image.

10. The apparatus of claim 8 wherein said arithmetic logic unit further comprises means for performing image accumulation where pointwise image match measures are summed over an area.

11. The apparatus of claim 8 wherein said arithmetic logic unit further comprises means for performing row-wise masked image summation and energy computations, whereby a two-dimensional image area is reduced to a one-dimensional image.

12. The apparatus of claim 11 wherein said arithmetic logic unit further comprises means for generating image transpositions, where said row-wise masked image summation is performed column-wise.

13. The apparatus of claim 8 wherein said arithmetic logic unit further comprises:
   means for quantizing an image within said image sequence; and
   means for run-length encoding adjacent zeroes within a quantized image for performing video compression of said image within said sequence of images.

14. The apparatus of claim 1 further comprising an electrically erasable programmable read-only memory (EEPROM), connected to the global bus, for storing application programs.

15. The apparatus of claim 1 further comprising a static random access memory (SRAM) connected to said digital signal processor.

16. The apparatus of claim 1 further comprising a first static random access memory (SRAM) connected to said first digital signal processor and a second static random access memory (SRAM) connected to said second digital signal processor.

17. Apparatus for image processing comprising:
   an imaging sensor for generating a sequence of images representing a scene;
   a cross-bar switch for selectively routing said sequence of images to a plurality of image storage elements, a pyramid processing circuit, and an arithmetic logic unit, where said image storage elements are video random access memories (VRAMs), said pyramid processing circuit generates a Gaussian and Laplacian pyramid from images provided by the crossbar switch, and said arithmetic logic unit provides object detection functions;
   a first-in, first-out buffer, connected to an output port of the crossbar switch, for buffering images from the crossbar switch at video rates;
   a first digital signal processor, connected to said buffer, for processing said images from said crossbar switch;
   a second digital signal processor, connected to said buffer, for processing said images from said crossbar switch, where said buffered images from said first-in, first-out buffer are coupled directly to a random access memory of said second digital signal processor;
   a first static random access memory (SRAM) connected to said first digital signal processor, where said buffered images from said first-in, first-out buffer are coupled directly to said first SRAM;
   a second static random access memory (SRAM) connected to said second digital signal processor, where said buffered images from said first-in, first-out buffer are coupled directly to said second SRAM;
   a global bus, connected to said crossbar switch and said digital signal processor, for communicating between said digital signal processor, said crossbar switch and an output connector;
   a dynamic random access memory (DRAM), connected to said global bus, for storing information derived from processing said images by said first and second digital signal processors; and
   a EEPROM, connected to the global bus, for storing application programs to be executed by said arithmetic logic unit and said digital signal processors.

18. The apparatus of claim 17 further comprising a look up table connected to said arithmetic logic unit and said cross-bar switch.

19. The apparatus of claim 17 wherein said arithmetic logic unit further comprises means for pointwise subtracting landmark image patches in a reference image from corresponding image patches in a current image, and an illumination-compensated reference image from a current image.

20. The apparatus of claim 17 wherein said arithmetic logic unit further comprises means for performing image accumulation where pointwise image match measures are summed over an area.

21. The apparatus of claim 17 wherein said arithmetic logic unit further comprises means for performing row-wise masked image summation and energy computations, whereby a two-dimensional image area is reduced to a one-dimensional image.

22. The apparatus of claim 21 wherein said arithmetic logic unit further comprises means for generating image transpositions, where said row-wise masked image summation is performed column-wise.

23. The apparatus of claim 17 wherein said arithmetic logic unit further comprises:

means for quantizing an image within said image sequence; and means for run-length encoding adjacent zeroes within a quantized image for performing video compression of said image within said sequence of images.

24. A traffic monitoring system for processing a sequence of images representing a scene of traffic comprising:

a cross-bar switch for selectively routing said sequence of images to a plurality of image storage elements, a pyramid processing circuit, and an arithmetic logic unit, where said pyramid processing circuit and said arithmetic logic unit process the sequence of images to generate a reference image representing stationary objects within the scene and generate motion images representing objects that are moving relative to the reference image;

a buffer, connected to an output port of the crossbar switch, for buffering the reference image and the motion images from the crossbar switch at video rates;

a digital signal processor, connected to said buffer, for processing said motion images and said reference image from said crossbar switch, where the buffered images from said buffer are coupled directly to a random access memory of said digital signal processor and said digital signal processor identifies the moving objects; and a global bus, connected to said crossbar switch and said digital signal processor, for communicating information between said digital signal processor, said crossbar switch and an output connector.

25. The traffic monitoring system of claim 24 wherein said arithmetic logic unit and digital signal processor further comprises means for updating said reference image with information within said images, where said information used for updating the reference image only represents stationary objects within the scene and substantially disregards moving objects and temporarily stationary objects within the scene.

26. The traffic monitoring system of claim 24 wherein said arithmetic logic unit and digital signal processor further comprises means for modifying said reference image using image information within said images regarding changes to illumination of the scene.

* * * * *